(12) United States Patent
Komaru et al.

(10) Patent No.: US 11,988,634 B2
(45) Date of Patent: May 21, 2024

(54) ION GENERATION APPARATUS AND ION MOBILITY ANALYSIS APPARATUS

(71) Applicant: SHARP KABUSHIKI KAISHA, Sakai (JP)

(72) Inventors: Shohei Komaru, Sakai (JP); Katsuhiko Kyuhken, Sakai (JP); Kohji Shinkawa, Sakai (JP); Tadashi Iwamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 5 days.

(21) Appl. No.: 17/536,863

(22) Filed: Nov. 29, 2021

(65) Prior Publication Data

US 2022/0178876 A1 Jun. 9, 2022

(30) Foreign Application Priority Data

Dec. 9, 2020 (JP) .................... 2020-204319

(51) Int. Cl.
*G01N 27/622* (2021.01)
*G01N 27/66* (2006.01)

(52) U.S. Cl.
CPC .......... *G01N 27/622* (2013.01); *G01N 27/66* (2013.01)

(58) Field of Classification Search
CPC ....... G01N 27/622; G01N 27/66; H01J 49/00; H01J 49/02; H01J 49/08; H01J 49/10; H01J 49/14; H01J 49/145; H01J 49/147

USPC ............................ 250/281, 288, 423 R, 427
See application file for complete search history.

(56) References Cited

U.S. PATENT DOCUMENTS

| 2008/0290266 | A1* | 11/2008 | Horsky | .................... H01J 49/06 250/281 |
| 2011/0095175 | A1* | 4/2011 | Bateman | .............. G01N 27/624 250/288 |
| 2016/0172146 | A1* | 6/2016 | Wang | .................... H01J 49/147 315/5.35 |
| 2020/0328071 | A1* | 10/2020 | Furuhashi | ............... H01J 49/08 |
| 2020/0393409 | A1* | 12/2020 | Hirakawa | ........... H01J 49/0445 |

FOREIGN PATENT DOCUMENTS

JP 2013-214443 A 10/2013

* cited by examiner

*Primary Examiner* — Jason L McCormack
(74) *Attorney, Agent, or Firm* — ScienBiziP, P.C.

(57) ABSTRACT

An ion generation apparatus according to the present invention includes an electron emission device, an opposite electrode, and a controller, the electron emission device includes a lower electrode, a surface electrode, and an intermediate layer provided between the lower electrode and the surface electrode, the opposite electrode is provided to be opposite to the surface electrode, and the controller is provided to apply a voltage to the surface electrode, the lower electrode, or the opposite electrode such that a potential of the surface electrode becomes higher than a potential of the lower electrode and a potential of the opposite electrode in a positive ion mode.

17 Claims, 8 Drawing Sheets

ION GENERATION APPARATUS AND ION MOBILITY ANALYSIS APPARATUS

BACKGROUND OF THE INVENTION

Field of the Invention

The present invention relates to an ion generation apparatus and an ion mobility analysis apparatus.

Description of the Background Art

An electron emission device is an ion source capable of emitting low-energy electrons and capable of negatively ionizing the target substance due to the attachment of the emitted low-energy electrons. There are known ion generation apparatuses using the electron emission device described above (see, for example, Japanese Unexamined Patent Application Publication No. 2013-214443). The ion generation apparatus applies a high voltage between a needle electrode and a flat-plate electrode to generate corona discharge in order to generate positive ions.

Positive ions are not generated by the attachment of low-energy electrons emitted from the electron emission device, and therefore when the electron emission device is used as an ion source for an analysis apparatus (e.g., ion mobility spectrometry (IMS)) that needs both negative and positive ionization, the electron emission device needs to be combined with an ion source (e.g., radiation source, corona discharge, or UV light source) capable of positive ionization, which causes the issue of an increase in the size of the apparatus.

The present invention has been made in view of the above-described circumstance to provide an ion generation apparatus capable of generating positive ions using an electron emission device.

SUMMARY OF THE INVENTION

The present invention provides an ion generation apparatus including an electron emission device, an opposite electrode, and a controller, wherein the electron emission device includes a lower electrode, a surface electrode, and an intermediate layer provided between the lower electrode and the surface electrode, the opposite electrode is provided to be opposite to the surface electrode, and the controller is provided to apply a voltage to the surface electrode, the lower electrode, or the opposite electrode such that a potential of the surface electrode becomes higher than a potential of the lower electrode and a potential of the opposite electrode in a positive ion mode for generating positive ions.

As the controller applies a voltage to the surface electrode or the lower electrode such that the potential of the surface electrode becomes higher than the potential of the lower electrode, the electrons flow from the lower electrode to the surface electrode, and the electrons are emitted from the surface electrode. By making a sufficiently large potential difference between the surface electrode and the lower electrode, the electrons emitted from the surface electrode may have an energy higher than the ionization energy of a first gas component, and the first gas component near the surface electrode may be positively ionized.

As the controller applies a voltage to the surface electrode or the opposite electrode such that the potential of the surface electrode becomes higher than the potential of the opposite electrode, the positive ions generated near the surface electrode may travel toward the opposite electrode. Thus, it is possible to prevent, near the surface electrode, the positive ions from being collected by the surface electrode and prevent the electrons, and the like, emitted from the electron emission device from attaching to the positive ions to neutralize the positive ions, and it is possible to use the positive ions having traveled between the surface electrode and the opposite electrode as analysis targets, etc. The generated positive ion passes a positive charge to a second gas component so as to positively ionize the second gas component.

DESCRIPTION OF THE PREFERRED EMBODIMENTS

An ion generation apparatus according to the present invention includes an electron emission device, an opposite electrode, and a controller, wherein the electron emission device includes a lower electrode, a surface electrode, and an intermediate layer provided between the lower electrode and the surface electrode, the opposite electrode is provided to be opposite to the surface electrode, and the controller is provided to apply a voltage to the surface electrode, the lower electrode, or the opposite electrode such that a potential of the surface electrode becomes higher than a potential of the lower electrode and a potential of the opposite electrode in a positive ion mode for generating positive ions.

The controller is preferably provided to apply a voltage between the lower electrode and the surface electrode such that the electron emission device emits electrons having an energy higher than an ionization energy of a gas component between the surface electrode and the opposite electrode in the positive ion mode. As the emitted electron collides with a gas component near the surface electrode, one electron may be removed from the gas component, and a positive ion of the gas component may be generated.

The controller is preferably provided to apply a voltage of 16 V or more and 60 V or less between the lower electrode and the surface electrode in the positive ion mode. Accordingly, it is possible to generate positive ions between the surface electrode and the opposite electrode.

The controller is provided to apply a voltage to the surface electrode, the lower electrode, or the opposite electrode such that the potential of the surface electrode becomes higher than the potential of the lower electrode and lower than the potential of the opposite electrode in a negative ion mode for generating negative ions. The controller is preferably provided to switch between the negative ion mode and the positive ion mode. Thus, it is possible to generate both negative ions and positive ions by using the ion generation apparatus.

The controller is preferably provided to apply a voltage of 6 V or more and 60 V or less between the lower electrode and the surface electrode in the negative ion mode. Thus, it is possible to generate negative ions between the surface electrode and the opposite electrode.

The present invention also provides an ion mobility analysis apparatus including the ion generation apparatus according to the present invention, an ion detector, and an electric field formation electrode. The ion detector and the controller are provided to measure a current generated when the ion detector receives a charge from an ion and to output an ion mobility spectrometry (IMS) spectrum.

The controller is preferably provided to adjust a voltage applied between the lower electrode and the surface electrode such that a reference peak appearing in the IMS spectrum has a predetermined height or a predetermined area. Thus, quantitative analysis of the sample gas may be executed based on the peak area or the peak height of the IMS spectrum.

The controller is preferably provided to adjust a voltage applied between the lower electrode and the surface electrode such that a height or area of a first reference peak appearing in the IMS spectrum in the positive ion mode is substantially identical to a height or area of a second reference peak appearing in the IMS spectrum in the negative ion mode. This allows qualitative analysis and quantitative analysis using the peak appearing in the IMS spectrum in the positive ion mode and the peak appearing in the IMS spectrum in the negative ion mode.

The controller is preferably provided to, when switching between the negative ion mode and the positive ion mode, change the potential of the surface electrode to a potential having an opposite polarity and substantially an equal absolute value and change the potential of the lower electrode to a potential having an opposite polarity and a different absolute value. Thus, it is possible to switch between the negative ion mode and the positive ion mode while maintaining the potential of the ion collector electrode at 0 V. By changing the potential of the lower electrode to a potential having an opposite polarity and a different absolute value, it is possible to prevent the electrons from not being emitted from the electron emission device.

The present invention is described below in more detail with reference to a plurality of embodiments. The drawings and descriptions below illustrate an example of a configuration, and the scope of the present invention is not limited to the one illustrated in the drawings and descriptions below.

First Embodiment

Figure 1:
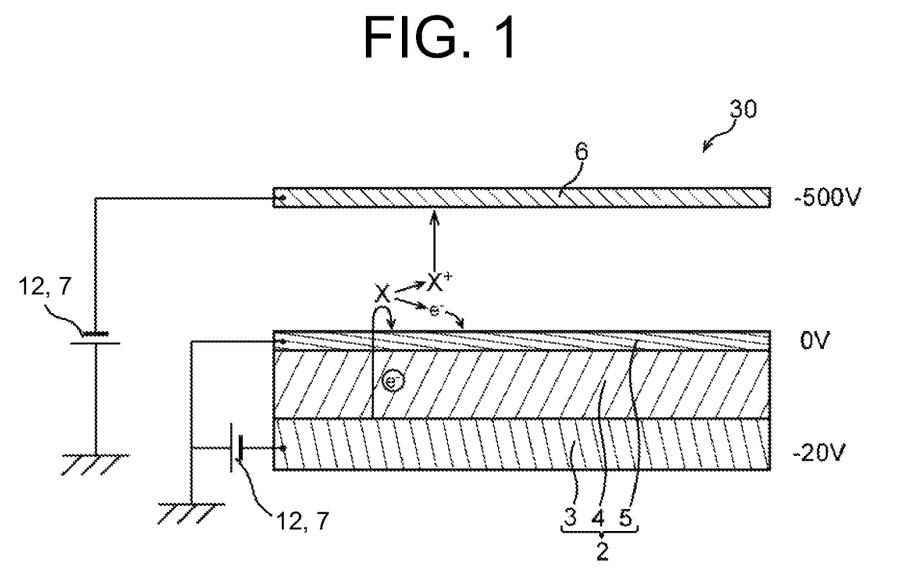
FIG. 1 is a schematic cross-sectional view of an ion generation apparatus according to an embodiment of the present invention.
Figure 2:
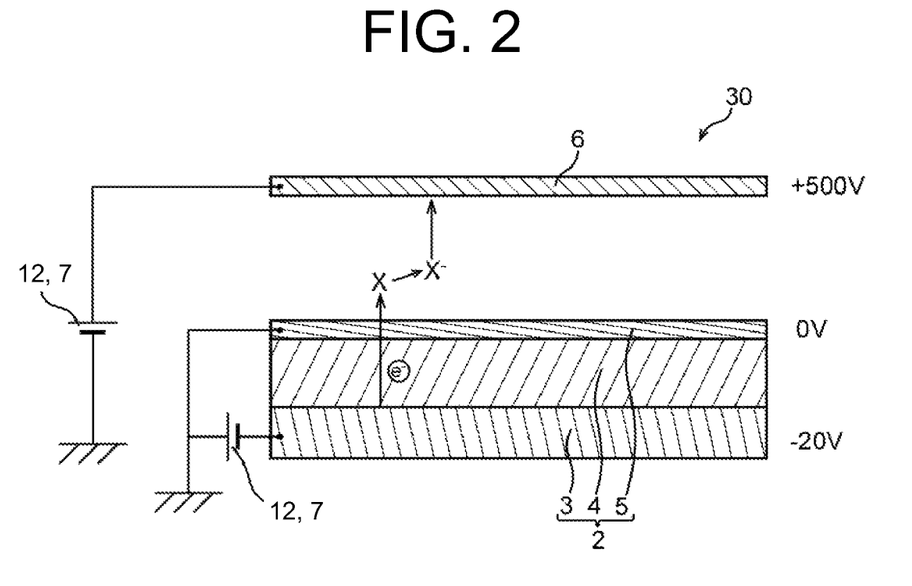
FIG. 2 is a schematic cross-sectional view of the ion generation apparatus according to an embodiment of the present invention.

FIG. 1 is a schematic cross-sectional view of an ion generation apparatus in a positive ion mode, and FIG. 2 is a schematic cross-sectional view of the ion generation apparatus in a negative ion mode.

An ion generation apparatus 30 according to the present embodiment includes an electron emission device 2, an opposite electrode 6, and a controller 7. The electron emission device 2 includes a lower electrode 3, a surface electrode 5, and an intermediate layer 4 provided between the lower electrode 3 and the surface electrode 5. The opposite electrode 6 is provided to be opposite to the surface electrode 5. The controller 7 is provided to apply a voltage to the surface electrode 5, the lower electrode 3, or the opposite electrode 6 such that the potential of the surface electrode 5 becomes higher than the potential of the lower electrode 3 and the potential of the opposite electrode 6 in a positive ion mode for generating positive ions.

The ion generation apparatus 30 is an apparatus that generates ions in a space (in air, in a gas, in a reduced-pressure atmosphere, etc.) between the surface electrode 5 and the opposite electrode 6. The ion generation apparatus 30 has the positive ion mode for generating positive ions. The ion generation apparatus 30 may have a negative ion mode for generating negative ions. The ion generation apparatus 30 may be provided to switch between the positive ion mode and the negative ion mode.

The ion generation apparatus 30 may be incorporated into an ion mobility analysis apparatus.

The electron emission device 2 is a device that emits electrons from an electron emission region of the surface electrode 5 into air, a gas, a reduced-pressure atmosphere, etc. The electron emission device 2 includes the lower electrode 3, the surface electrode 5, and the intermediate layer 4 provided between the lower electrode 3 and the surface electrode 5. The electron emission device 2 may include an insulating layer that defines the electron emission region.

The lower electrode 3 is an electrode located under the intermediate layer 4. The lower electrode 3 may be a metal substrate or a conductive material layer (metallic layer, conductive layer, etc.) provided on an insulating substrate (or semiconductor substrate).

When the lower electrode 3 includes a metal substrate, the lower electrode 3 is, for example, an aluminum plate, a stainless steel plate, a nickel plate, or the like. The thickness of the lower electrode 3 is preferably 200 µm or more and 1 mm or less.

When the lower electrode 3 is a conductive material layer provided on an insulating substrate (or semiconductor substrate), the substrate is, for example, a glass substrate, a resin substrate, a ceramic substrate, or the like. The thickness of the substrate is preferably 200 µm or more and 2 mm or less.

When the lower electrode 3 is a conductive material layer, the lower electrode 3 may be formed on a substrate by, for example, a sputtering method, a vapor deposition method, a plating method, or a CVD method. The lower electrode 3 may be a single-layer electrode or a laminated electrode. The lower electrode 3 may include, for example, an aluminum layer, a gold layer, a copper layer, etc. The lower electrode 3 may be a Mo/Al/Mo laminated electrode. The thickness of the lower electrode 3 is preferably 200 nm or more and 1 µm or less.

The insulating layer is a layer including an insulator and provided on the lower electrode 3. For example, when the lower electrode 3 is an aluminum substrate, the insulating layer may be an oxide film of the aluminum substrate. For example, when the lower electrode 3 is provided on a substrate, the insulating layer is, for example, a silicon nitride layer (SiN layer), a silicon oxide layer ($SiO_2$ layer), a silicon oxynitride film (SiON film), an aluminum oxide layer ($Al_2O_3$ layer), etc. The thickness of the insulating layer is preferably 0.5 μm or more and 2 μm or less. The insulating layer may be formed by using, for example, a photolithography method, a sputtering method, or a CVD method.

The insulating layer includes an opening serving as an electron emission region. The electron emission region is a region where electrons flow through the intermediate layer 4 from the lower electrode 3 to the surface electrode 5 due to the inhomogeneous electric field generated between the lower electrode 3 and the surface electrode 5 and the electrons are emitted from the surface electrode 5 to the outside. The intermediate layer 4 is provided in the opening. This allows the current to flow only in the region of the intermediate layer 4 overlapped with the opening and allows the electrons to be emitted from the region of the surface electrode 5 overlapped with the opening of the insulating layer. Thus, the opening of the insulating layer may define the electron emission region.

The intermediate layer 4 is provided on the lower electrode 3. The intermediate layer 4 is a layer through which the current flows due to the inhomogeneous electric field formed by the potential difference between the surface electrode 5 and the lower electrode 3. The intermediate layer 4 is, for example, an insulating resin layer including conductive fine particles in a dispersed state.

Metallic particles having conductivity, such as gold, silver, platinum, or palladium, may be used as the conductive fine particles included in the intermediate layer 4. Carbon, conductive polymers, and/or semi-conductive materials may also be used as a conductive material other than metallic particles. The insulating resin included in the intermediate layer 4 is, for example, silicone resin with condensation polymerization of silanol ($R_3$—Si—OH), acrylic resin, polycarbonate, or polyester. The conductive fine particles are dispersed in the insulating resin, but a part of the conductive fine particles may be agglomerated. The content of the conductive fine particles in the intermediate layer 4 may be changed as appropriate. The content of the conductive fine particles may be changed to adjust the resistance value of the intermediate layer 4.

The thickness of the intermediate layer 4 is not limited, but is preferably 0.5 μm or more and 2.0 μm or less, and more preferably 0.75 μm or more and 1.5 μm or less. This allows the electrons to be emitted from the electron emission device 2 with a relatively low voltage applied between the lower electrode 3 and the surface electrode 5 and may improve the lifetime characteristics of the electron emission device 2.

The intermediate layer 4 is formed by a coating method such as a spin coating method, a doctor blade method, a spray method, or a dipping method.

An example of the method for creating the intermediate layer 4 is described. First, 3 g of silicone resin, which is a resin, and 0.03 g of Ag nanoparticles, which are conductive fine particles, are put and mixed in a reagent bottle. As a result, a mixture liquid of the silicone resin and the Ag nanoparticles is prepared. Subsequently, the mixture liquid put in the reagent bottle is further agitated using an ultrasonic vibrator so that an application liquid is prepared. The viscosity of the application liquid is preferably 0.8 to 15 mPa·s. The resin component ratio in the application liquid is preferably approximately 10 to 70 wt %. The application liquid is applied onto the lower electrode 3 and then becomes a silicone resin due to condensation polymerization by the moisture in the air to form the intermediate layer 4.

The surface electrode 5 is an electrode located on the surface of the electron emission device 2 and is provided at the intermediate layer 4 and the insulating layer. The surface electrode 5 is, for example, a single-layer electrode including an Au layer, a single-layer electrode including a Pt layer, or a laminated electrode including an Au layer and a Pt layer.

The surface electrode 5 may have a thickness of 5 nm or more and 100 nm or less, preferably 40 nm or more and 100 nm or less. The material of the surface electrode 5 is a plurality of conductive materials having high electrical conductivity, for example, metallic material such as gold or platinum, semiconductor, indium tin oxide (ITO), or carbon, to prevent excessive destruction as a whole. The surface electrode 5 may include a plurality of metallic layers.

Even when the thickness of the surface electrode 5 is 40 nm or more, the surface electrode 5 may include a plurality of openings, gaps, and/or thinned portions having a thickness of 10 nm or less. The electrons flowing from the intermediate layer 4 may pass through or penetrate through the opening, gap, and/or thinned portion, and the electrons may be emitted from the surface electrode 5. Such an opening, gap, and/or thinned portion is also formed by performing a thin film formation process (sputtering method, vapor deposition method) accompanied by a typical patterning process on the metal included in the surface electrode 5. The electrons emitted from the surface electrode 5 generate positive or negative ions.

The opposite electrode 6 is an electrode that forms an electric field between the surface electrode 5 of the electron emission device 2 and the opposite electrode 6. The electric field may cause the positive ions or negative ions generated near the surface electrode 5 to travel toward the opposite electrode 6 and may prevent the neutralization of the positive ions or negative ions. The opposite electrode 6 is provided to be opposite to the surface electrode 5. The opposite electrode 6 may be a metallic plate, a metallic layer, a conductive layer, or a metallic mesh electrode.

The controller 7 is a part that controls the ion generation apparatus 30. The controller 7 may be a part that controls an apparatus (e.g., ion mobility analysis apparatus) in which the ion generation apparatus 30 is incorporated. The controller 7 may include a microcontroller including, for example, a CPU, a memory, a timer, and an input/output port. The controller 7 may include a power source, a potential control circuit, etc.

The controller 7 may control the ion generation apparatus 30 to generate positive ions in the space between the surface electrode 5 and the opposite electrode 6 (positive ion mode).

The controller 7 applies a voltage to the surface electrode 5 or the lower electrode 3 such that the potential of the surface electrode 5 becomes higher than the potential of the lower electrode 3 in the positive ion mode. Thus, the electrons flow from the lower electrode 3 toward the surface electrode 5, and the electrons are emitted from the electron emission region of the surface electrode 5.

The controller 7 may apply a voltage between the lower electrode 3 and the surface electrode 5 such that the electron emission device 2 emits the electrons having an energy higher than the ionization energy of a gas component between the surface electrode 5 and the opposite electrode 6 in the positive ion mode. When the emitted electron collides with the gas component near the surface electrode 5, one electron may be removed from the gas component and a positive ion of the gas component may be generated.

In the case of field electron emission, it is considered that the maximum energy of the emitted electron is a value (X−5.3) eV, which is obtained by subtracting a work function (5.3 eV) of gold of the surface electrode 5 from a voltage X (V) (device drive voltage) applied between the lower electrode 3 and the surface electrode 5.

For example, when there is air between the surface electrode 5 and the opposite electrode 6, the controller 7 applies the voltage X (V) between the lower electrode 3 and the surface electrode 5 such that the electron emission device 2 emits the electrons having an energy higher than the ionization energy of nitrogen gas, the ionization energy of oxygen gas, the ionization energy of water, the ionization energy of argon, or the ionization energy of carbon dioxide.

For example, when positive ions (e.g., $H_3O^+$) of water are generated near the surface electrode 5 by the electrons emitted from the electron emission device 2, a voltage higher than (12.6+5.3)=17.9 V is applied between the lower electrode 3 and the surface electrode 5, as the ionization energy of water is 12.6 eV.

For example, when there is ammonia between the surface electrode 5 and the opposite electrode 6, and ammonia ions (positive ions) are generated near the surface electrode 5 by the emitted electrons, the controller 7 applies the voltage X (V) between the lower electrode 3 and the surface electrode 5 such that the electron emission device 2 emits the electrons having an energy higher than the ionization energy of ammonia. As the ionization energy of ammonia is 10.1 eV, a voltage higher than (10.1+5.3)=15.4 V is applied between the lower electrode 3 and the surface electrode 5. Accordingly, in the positive ion mode, the voltage applied between the lower electrode 3 and the surface electrode 5 may be 16 V or more and 60 V or less, and preferably 20 V or more and 40 V or less.

The ion generation apparatus 30 may also generate positive ions by penning ionization. In this case, the ion generation apparatus 30 is configured such that there are neutral atoms or molecules (e.g., He) near the surface electrode 5. The electrons are emitted from the surface electrode 5 of the electron emission device 2 to the neutral atoms or molecules to obtain a metastable excited state and then collide with the target substance to be ionized.

$A^* + B \rightarrow A + B^+ + e^-$, where $A^*$ is an electronically excited state of A, B is an atom or molecule, and $e^-$ is an electron.

For example, when He is used as a neutral atom for penning ionization, the energy of the electrons emitted from the electron emission device 2 is preferably 20 V or more.

The controller 7 applies a voltage to the surface electrode 5 or the opposite electrode 6 such that the potential of the surface electrode 5 becomes higher than the potential of the opposite electrode 6 in the positive ion mode. The electric field generated by the application of the voltage causes the positive ions generated near the surface electrode 5 to travel toward the opposite electrode 6 and causes the emitted electrons and the negative ions generated by the emitted electrons to travel toward the surface electrode 5. Therefore, it is possible to separate the positive ions from the negative ions and the electrons and to prevent the neutralization of the positive ions. As a result, the positive ions may be generated in the space between the surface electrode 5 and the opposite electrode 6. Further, the positive ions pass positive charges to other gas components so that positive ions of the other gas components may also be generated.

For example, as illustrated in FIG. 1, the surface electrode 5 is connected to the ground to set 0 V, and the power source 12 (the controller 7) applies a voltage to the lower electrode 3 and the opposite electrode 6 so that the lower electrode 3 may be set to −20 V and the opposite electrode 6 may be set to −500 V. In this case, the electrons flow from the lower electrode 3 to the surface electrode 5 to be emitted from the surface electrode 5. The emitted electrons collide (electron collision) with gas molecules (or gas atoms) X near the surface electrode 5 to generate $X^+$. The electric field between the surface electrode 5 and the opposite electrode 6 causes $X^+$ to travel toward the opposite electrode 6 and causes the electrons to flow to the surface electrode 5.

The controller 7 may control the ion generation apparatus 30 to generate negative ions in the space between the surface electrode 5 and the opposite electrode 6 (negative ion mode).

The controller 7 applies a voltage to the surface electrode 5 or the lower electrode 3 such that the potential of the surface electrode 5 becomes higher than the potential of the lower electrode 3 in the negative ion mode. Thus, the electrons flow from the lower electrode 3 toward the surface electrode 5, and the electrons are emitted from the electron emission region of the surface electrode 5. In the negative ion mode, the voltage (device drive voltage) applied between the lower electrode 3 and the surface electrode 5 may be 6 V or more and 60 V or less, and preferably may be 10 V or more and 20 V or less. The energy obtained by the electrons when the electrons are accelerated by the voltage applied between the lower electrode 3 and the surface electrode 5 is made larger than the work function of gold so that the electrons may be emitted from the electron emission regions of the surface electrode 5. The emitted electrons attach to gas molecules (or gas atoms) near the surface electrode 5 (electron attachment phenomenon (non-dissociative electron attachment, dissociative electron attachment)), and negative ions of the gas molecules (or negative ions of the gas atoms) are generated.

The controller 7 applies a voltage to the surface electrode 5 or the opposite electrode 6 such that the potential of the surface electrode 5 becomes lower than the potential of the opposite electrode 6 in the negative ion mode. The electric field generated by the application of the voltage causes the negative ions generated near the surface electrode 5 to travel toward the opposite electrode 6. This allows the negative ions to be generated in the space between the surface electrode 5 and the opposite electrode 6. Further, the negative ions pass negative charges to other gas components so that negative ions of the other gas components may also be generated.

It is considered that, in the negative ion mode, even when the positive ions are generated near the surface electrode 5, the positive ions travel toward the surface electrode 5 due to the electric field, and therefore the emitted electrons attach to the positive ions to neutralize the positive ions.

For example, as illustrated in FIG. 2, the surface electrode 5 is connected to the ground to set 0 V, and the power source 12 (the controller 7) applies a voltage to the lower electrode 3 and the opposite electrode 6 so that the lower electrode 3 may be set to −20 V and the opposite electrode 6 may be set to +500 V. In this case, the electrons flow from the lower electrode 3 to the surface electrode 5 to be emitted from the surface electrode 5. The emitted electrons attach to the gas molecules (or gas atoms) X near the surface electrode 5 to generate $X^-$. The electric field between the surface electrode 5 and the opposite electrode 6 causes $X^-$ to travel toward the opposite electrode 6.

The controller 7 may be provided to switch between the positive ion mode and the negative ion mode. This makes it possible to generate the positive ions and the negative ions using the single electron emission device 2. The controller 7 may change the voltage applied to the lower electrode 3, the surface electrode 5, or the opposite electrode 6 to switch between the positive ion mode and the negative ion mode.

Second Embodiment

A second embodiment relates to a drift-tube ion mobility analysis apparatus in which the ion generation apparatus 30 according to the first embodiment is incorporated. The controller 7 described in the first embodiment is a part that controls the ion mobility analysis apparatus according to the second embodiment. The ion mobility analysis apparatus is also in the positive ion mode when the ion generation apparatus 30 is in the positive ion mode, and the ion mobility analysis apparatus is also in the negative ion mode when the ion generation apparatus 30 is in the negative ion mode. The ion mobility analysis apparatus may be provided to switch between the positive ion mode and the negative ion mode.

Figure 3:
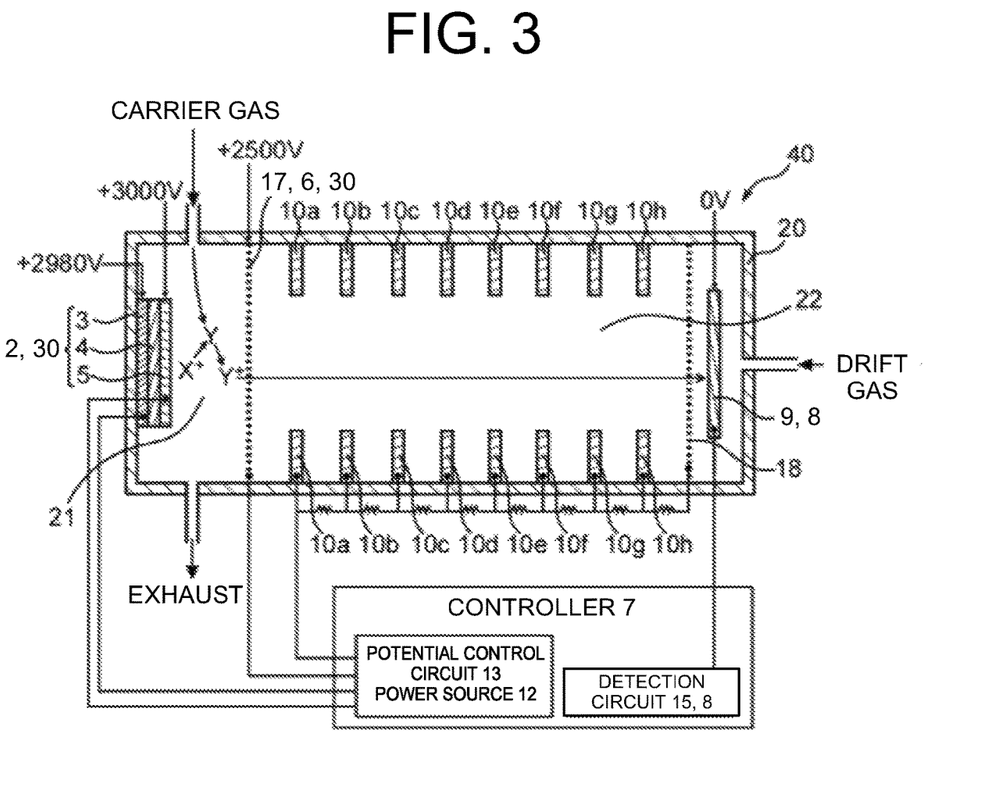
FIG. 3 is a schematic cross-sectional view of an ion mobility analysis apparatus according to an embodiment of the present invention.
Figure 4:
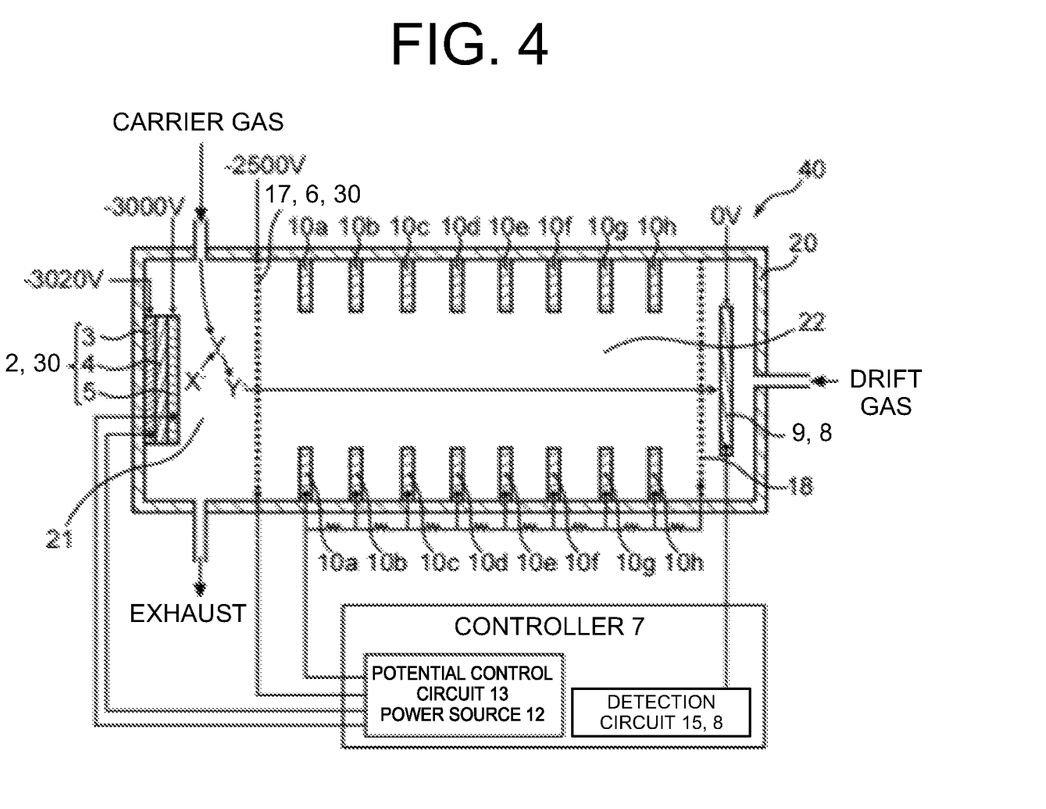
FIG. 4 is a schematic cross-sectional view of the ion mobility analysis apparatus according to an embodiment of the present invention.

FIG. 3 is a schematic cross-sectional view of an ion mobility analysis apparatus in the positive ion mode, and FIG. 4 is a schematic cross-sectional view of the ion mobility analysis apparatus in the negative ion mode.

An ion mobility analysis apparatus 40 according to the present embodiment includes the ion generation apparatus 30, an ion detector 8, and electric field formation electrodes 10a to 10h (10), and the ion detector 8 and the controller 7 are provided to measure the current generated when the ion detector 8 receives a charge from an ion and to output an IMS spectrum. In the ion mobility analysis apparatus 40, a gate electrode 17 serves as the opposite electrode 6.

The ion mobility analysis apparatus 40 is an apparatus that analyzes a sample gas by ion mobility spectrometry (IMS). The ion mobility analysis apparatus 40 includes a reaction chamber 21 (between the electron emission device 2 and the gate electrode 17 (the opposite electrode 6)) for ionizing a sample gas introduced into a chassis 20 together with a carrier gas and a drift region 22 (between the gate electrode 17 and an ion collector electrode 9) for moving and separating ions (positive ions or negative ions) generated in the reaction chamber 21 toward the ion collector electrode 9 (the ion detector 8). The drift region 22 is a region where a potential gradient (electric field) is formed by the electric field formation electrodes 10a to 10h having a ring shape and the ions travel from the gate electrode 17 to the ion collector electrode 9 due to the potential gradient.

The reaction chamber 21 and the drift region 22 are separated by the gate electrode 17 (lattice electrode). The electron emission device 2 is provided at the opposite end of the reaction chamber 21 from the gate electrode 17 such that the surface electrode 5 is provided at the side of the reaction chamber 21. Therefore, the gate electrode 17 functions as the opposite electrode 6 for the electron emission device 2. The ion collector electrode 9 is provided at the opposite end of the drift region 22 from the gate electrode 17.

When the sample gas enters the reaction chamber 21 through a sample inlet together with the carrier gas, the sample gas passes through the reaction chamber 21 between the electron emission device 2 and the gate electrode 17 to be ionized by the charge caused due to the electrons emitted from the electron emission device 2. The carrier gas, a non-ionized gas, and the like, are exhausted together with the drift gas through an exhaust port provided on a side surface of the reaction chamber 21.

A drift gas, such as dry gas, from which impurities have been removed, enters the chassis 20 of the ion mobility analysis apparatus 40 through a drift gas inlet on the side of the ion collector electrode 9, flows through the drift region 22 from the side of the ion collector electrode 9 to the side of the gate electrode 17, flows into the reaction chamber 21, and discharges through the exhaust port together with the carrier gas. The drift gas is preferably dry nitrogen or air having passed through a desiccant. In order to reduce impurities in the drift gas, the drift gas preferably passes through a filter before introduction.

The configuration of the electron emission device 2 has been described in the first embodiment and is therefore omitted here.

When the ion generation apparatus 30 and the ion mobility analysis apparatus 40 are in the positive ion mode, the controller 7 (the potential control circuit 13 and the power source 12) applies a voltage to the lower electrode 3, the surface electrode 5, or the gate electrode 17 such that the potential of the surface electrode 5 becomes higher than the potential of the lower electrode 3 and the potential of the gate electrode 17. With such an application of the voltage, as described in the first embodiment, a positive ion $X^+$ generated near the surface electrode 5 travels toward the gate electrode 17 through the reaction chamber 21. As illustrated in FIG. 3, as a sample gas Y is supplied to the reaction chamber 21, a positive charge is transferred to the sample gas Y from the positive ion $X^+$ generated by the emitted electron, and the sample gas becomes positively ionized. A positive ion $Y^+$ of the sample gas is then induced toward the gate electrode 17 (the opposite electrode 6).

When the ion generation apparatus 30 and the ion mobility analysis apparatus 40 are in the negative ion mode, the controller 7 (the potential control circuit 13 and the power source 12) applies a voltage to the lower electrode 3, the surface electrode 5, or the gate electrode 17 such that the potential of the surface electrode 5 becomes higher than the potential of the lower electrode 3 and the potential of the surface electrode 5 becomes lower than the potential of the gate electrode 17. With such an application of the voltage, as described in the first embodiment, a negative ion $X^-$ generated near the surface electrode 5 travels through the reaction chamber 21 toward the gate electrode 17. As illustrated in FIG. 4, as the sample gas is supplied to the reaction chamber 21, a negative charge is transferred to the sample gas Y from the negative ion $X^-$ generated by the emitted electron, and the sample gas becomes negatively ionized. The negative ion $Y^-$ of the sample gas is then induced toward the gate electrode 17 (the opposite electrode 6).

The gate electrode 17 is an electrode that separates the reaction chamber 21 and the drift region 22 and is an electrode that controls the injection of positive ions or negative ions generated in the reaction chamber 21 into the drift region 22 by using the electrostatic interaction between the ions and the gate electrode 17. The gate electrode 17 also functions as the opposite electrode 6 (induction electrode).

The gate electrode 17 may be a ring-shaped electrode, a grid electrode, or an electrode having a grid electrode in an opening of a ring-shaped electrode. The gate electrode 17 is preferably a grid electrode. The gate electrode 17 may be arranged in a row together with the ring-shaped electric field formation electrodes 10a to 10h that form a potential gradient (electric field) in the drift region 22.

When the ion generation apparatus 30 and the ion mobility analysis apparatus 40 are in the positive ion mode, the controller 7 (the potential control circuit 13) applies a voltage to the electric field formation electrodes 10a to 10h such that the potential of the drift region 22 gradually decreases toward the ion collector electrode 9. The electric field generated due to the application of the voltage allows the positive ions having passed through the gate electrode 17 to travel toward the ion collector electrode 9 through the drift region 22. For example, as illustrated in FIG. 3, the potential of the ion collector electrode 9 may be set to 0 V, the potential of the gate electrode 17 (when opened) may be set to +2500 V, the potential of the surface electrode 5 may be set to +3000 V, and the potential of the lower electrode 3 may be set to +2980 V.

When the ion generation apparatus 30 and the ion mobility analysis apparatus 40 are in the negative ion mode, the controller 7 (the potential control circuit 13) applies a voltage to the electric field formation electrodes 10a to 10h such that the potential of the drift region 22 gradually increases toward the ion collector electrode 9. The electric field generated by the application of the voltage allows the negative ions having passed through the gate electrode 17 to travel toward the ion collector electrode 9 through the drift region 22. For example, as illustrated in FIG. 4, the potential of the ion collector electrode 9 may be set to 0 V, the potential of the gate electrode 17 (when opened) may be set to −2500 V, the potential of the surface electrode 5 may be set to −3000 V, and the potential of the lower electrode 3 may be set to −3020 V.

The gate electrode 17 may be electrically connected to the controller 7 (the potential control circuit 13 and the power source 12), and the controller 7 controls the potential of the gate electrode 17 so as to change the potential of the gate electrode 17 to switch between an opened state and a closed state of the gate electrode 17.

For example, when the potential of the gate electrode 17 is low, the negative ions in the reaction chamber 21 are not able to approach the gate electrode 17 due to electrostatic interaction (a repulsive force from the gate electrode 17 acts on the negative ions) and are not able to pass through the gate electrode 17. When the potential of the gate electrode 17 is low, the positive ions in the reaction chamber 21 are attracted to travel and come into contact with the gate electrode 17 so that the charges of the positive ions are transferred to the gate electrode 17 and the positive ions are neutralized. For this reason, the positive ions are not able to pass through the gate electrode 17. Thus, the gate electrode 17 is closed (low-potential side closed).

For example, when the potential of the gate electrode 17 is high, the negative ions in the reaction chamber 21 are attracted to travel and come into contact with the gate electrode 17 so that the charges of the negative ions are transferred to the gate electrode 17 and the negative ions are neutralized. For this reason, the negative ions are not able to pass through the gate electrode 17. When the potential of the gate electrode 17 is high, the positive ions in the reaction chamber 21 are not able to approach the gate electrode 17 due to electrostatic interaction (a repulsive force from the gate electrode 17 acts on the positive ions) and are not able to pass through the gate electrode 17. Therefore, the gate electrode 17 is closed (high-potential side closed).

For example, when the potential of the gate electrode 17 is in the middle of low-potential side closed and high-potential side closed, the positive icons or negative ions in the reaction chamber 21 are able to pass through the gate electrode 17, and the gate electrode 17 is opened.

By using the controller 7 (the potential control circuit 13), the potential of the gate electrode 17 is changed such that the gate electrode 17 is instantaneously changed from high-potential side closed, opened, and then low-potential side closed, or the gate electrode 17 is instantaneously changed from low-potential side closed, opened, and then high-potential side closed, so that the gate electrode 17 may be opened only for a very short time and the negative ions or positive ions in the reaction chamber 21 may be injected into the drift region 22 only during this short time. Accordingly, the negative ions or positive ions in the reaction chamber 21 may be injected into the drift region 22 in the form of a single pulse.

The negative ions or positive ions injected into the drift region 22 by the gate electrode 17 travel through the drift region 22 toward the ion collector electrode 9 due to the potential gradient formed by the electric field formation electrodes 10a to 10h and reach the ion collector electrode 9. The negative ions or positive ions then pass the charges to the ion collector electrode 9 to be neutralized.

The ion detector 8 (the detection circuit 15) and the controller 7 measure the current generated when the ion collector electrode 9 receives the charge and output it as an IMS spectrum. Specifically, the ion mobility spectrum (IMS spectrum) may be obtained by plotting, on the horizontal axis, the ion flight time from when the gate electrode 17 is instantaneously opened until when the ions reach the ion collector electrode 9 and, on the vertical axis, the signal intensity (current amount, IMS intensity).

When the ion mobility analysis apparatus 40 is in the positive ion mode, the positive ions reach the ion collector electrode 9 and pass the positive charges to the ion collector electrode 9. When the ion mobility analysis apparatus 40 is in the negative ion mode, the negative ions reach the ion collector electrode 9 and pass the negative charges to the ion collector electrode 9. Therefore, the directions of the currents flowing through the detection circuit 15 are opposite in the positive ion mode and the negative ion mode. Therefore, when the positive ion mode and the negative ion mode are switched, the positive/negative polarity of the ion detector 8 (the detection circuit 15) is switched.

The drift gas flowing from the ion collector electrode 9 to the gate electrode 17 in the drift region 22 is a resistance for the positive ions or negative ions moving from the gate electrode 17 to the ion collector electrode 9. The magnitude of the resistance (mobility of ions) is different depending on the ion species. In general, the mobility is inversely proportional to the collisional cross-sectional area of the ions, and therefore the larger the collisional cross-sectional area of the ions, the longer it takes for the ions to reach the ion collector electrode 9. Therefore, the time (travel time, peak position) from when the ions are injected into the drift region 22 by the gate electrode 17 until when the ions reach the ion collector electrode 9 is different depending on the ion species. For this reason, multiple species of ions injected into the drift region 22 from the gate electrode 17 are separated while moving through the drift region 22 and reach the ion collector electrode 9 with a time difference.

As the IMS intensity (collected current) of the IMS spectrum corresponds to the number of ions having reached the ion collector electrode 9, peaks corresponding to various ions appear in the IMS spectrum. The ions may be identified based on the peak position (travel time). Repeated measurement enables monitoring of changes in the number of ions. The peak intensity (peak height) or peak area of the peak appearing in the IMS spectrum corresponds to the number of ions. The peak of ions generated from air, which is a carrier gas, also appears in the IMS spectrum.

The controller 7 may also integrate and average a plurality of IMS spectra obtained by repeating a measurement to calculate an average IMS spectrum (averaging process). Thus, a stable IMS spectrum may be obtained. The number of IMS spectra to be averaged is not particularly limited, but is preferably 10 or more and 200 or less.

For example, when the time required for one measurement is 0.1 seconds, the controller 7 averages the IMS spectra obtained by repeating a measurement 64 times so as to calculate the average IMS spectrum. In this case, the time required for the averaging process is 6.4 seconds.

After the sample gas is introduced into the reaction chamber 21, measurement is conducted in both the positive ion mode and the negative ion mode so that both the IMS spectra in the positive ion mode and the negative ion mode may be obtained for the single sample. Therefore, conducting analysis in both modes by switching between the positive ion mode and the negative ion mode may improve the analysis accuracy of the sample gas.

The controller 7 may be provided to, when switching between the negative ion mode and the positive ion mode, change the potential of the surface electrode 5 to a potential having the opposite polarity and a substantially equal absolute value and to change the potential of the lower electrode 3 to a potential having the opposite polarity and a different absolute value. Thus, the negative ion mode and the positive ion mode may be switched while the potential of the ion collector electrode 9 is maintained at 0 V. By changing the potential of the lower electrode 3 to a potential having the opposite polarity and a different absolute value, it is possible to prevent the electrons from not being emitted from the electron emission device 2.

When the negative ion mode and the positive ion mode are switched, the controller 7 may change the potential of the lower electrode 3 and the potential of the surface electrode 5 such that the potential of the lower electrode 3 becomes lower than the potential of the surface electrode 5. Accordingly, the absolute value of the potential of the lower electrode 3 in the negative ion mode is larger than the absolute value of the potential of the lower electrode 3 in the positive ion mode.

For example, in the negative ion mode, when the potential difference between the lower electrode 3 and the surface electrode 5 is 15 V and the potential of the surface electrode 5 is −3000 V, the potential of the lower electrode 3 may be −3015 V. For example, when the potential difference between the lower electrode 3 and the surface electrode 5 in the positive ion mode is 30 V and the potential of the surface electrode 5 is +3000 V, the potential of the lower electrode 3 may be +2970 V.

In the positive ion mode, the type of air ion does not change as long as the electrons have an energy more than the ionization energy of air. Therefore, the sensitivity and the resolution may be increased by adjusting the device drive voltage in the range of 20 V, at which positive ions are detected, and 60 V, at which the device is damaged. An increase in the device drive voltage may cause an increase in the number of positive ions and an increase in the sensitivity. Conversely, a decrease in the device drive voltage may cause a decrease in the peak width and an increase in the resolution.

When the device drive voltage is adjusted, the potential of the lower electrode 3 may be changed without changing the potential of the surface electrode 5. Thus, the potential difference between the surface electrode 5 and the gate electrode 17 (the opposite electrode 6) may be maintained.

When the controller 7 is provided to integrate and average a plurality of IMS spectra obtained by repeating a measurement to calculate the average IMS spectrum, the controller 7 may be provided to switch between the negative ion mode and the positive ion mode each time the calculation of the average IMS spectrum ends. Thus, it is possible to detect both the negative ions and the positive ions generated from the components included in the sample gas.

For example, when the time required for one measurement is 0.1 seconds, the controller 7 may average the IMS spectra obtained by repeating a measurement 64 times in the negative ion mode to calculate the average IMS spectrum. Then, the controller 7 switches the measurement mode from the negative ion mode to the positive ion mode and averages the IMS spectra obtained by repeating a measurement 64 times in the positive ion mode so as to calculate the average IMS spectrum.

The controller 7 (the potential control circuit 13 and the power source 12) may be provided to adjust the voltage applied between the lower electrode 3 and the surface electrode 5 such that a reference peak (e.g., a primary peak of air ions) appearing in the IMS spectrum has a predetermined height or a predetermined area. Thus, quantitative analysis of the sample gas may be executed based on the peak area or the peak height of the IMS spectrum.

The controller 7 (the potential control circuit 13 and the power source 12) may be provided to adjust the voltage applied between the lower electrode 3 and the surface electrode 5 such that the height or area of a first reference peak (e.g., a primary peak of air ions) appearing in the IMS spectrum in the positive ion mode is substantially identical to the height or area of a second reference peak (e.g., a primary peak of air ions) appearing in the IMS spectrum in the negative ion mode. This allows qualitative analysis and quantitative analysis using the peak appearing in the IMS spectrum in the positive ion mode and the peak appearing in the IMS spectrum in the negative ion mode.

The description of the ion generation apparatus according to the first embodiment also applies to the ion generation apparatus included in the ion mobility analysis apparatus according to the second embodiment as long as there is no contradiction.

Third Embodiment

A third embodiment relates to a field asymmetric ion mobility analysis apparatus (an analysis apparatus that analyzes with a field asymmetric method IMS (FAIMS)) in which the ion generation apparatus 30 according to the first embodiment is incorporated. The controller 7 described in the first embodiment is a part that controls the ion mobility analysis apparatus according to the third embodiment. The ion mobility analysis apparatus is also in the positive ion mode when the ion generation apparatus 30 is in the positive ion mode, and the ion mobility analysis apparatus is also in the negative ion mode when the ion generation apparatus 30 is in the negative ion mode. The ion mobility analysis apparatus may be provided to switch between the positive ion mode and the negative ion mode.

Figure 5:
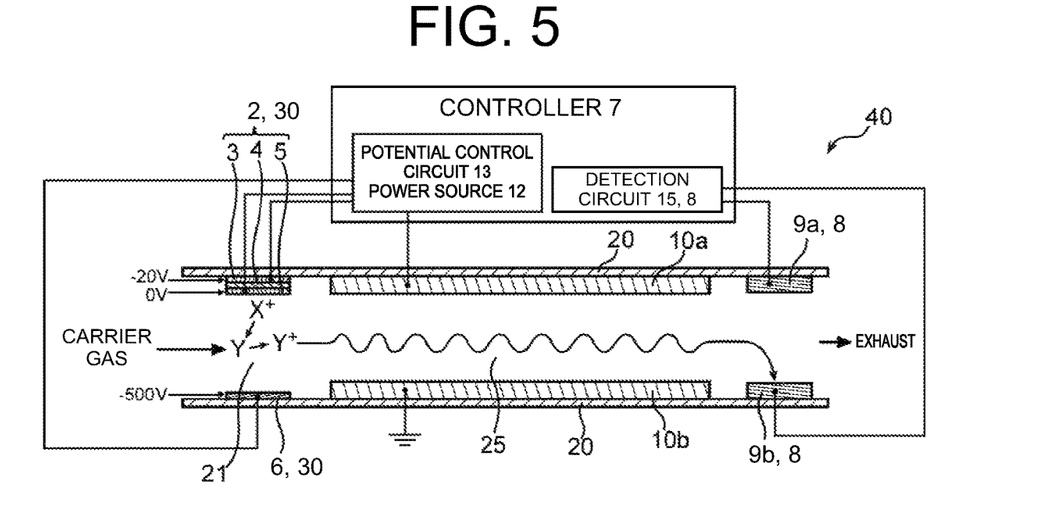
FIG. 5 is a schematic cross-sectional view of the ion mobility analysis apparatus according to an embodiment of the present invention.
Figure 6:
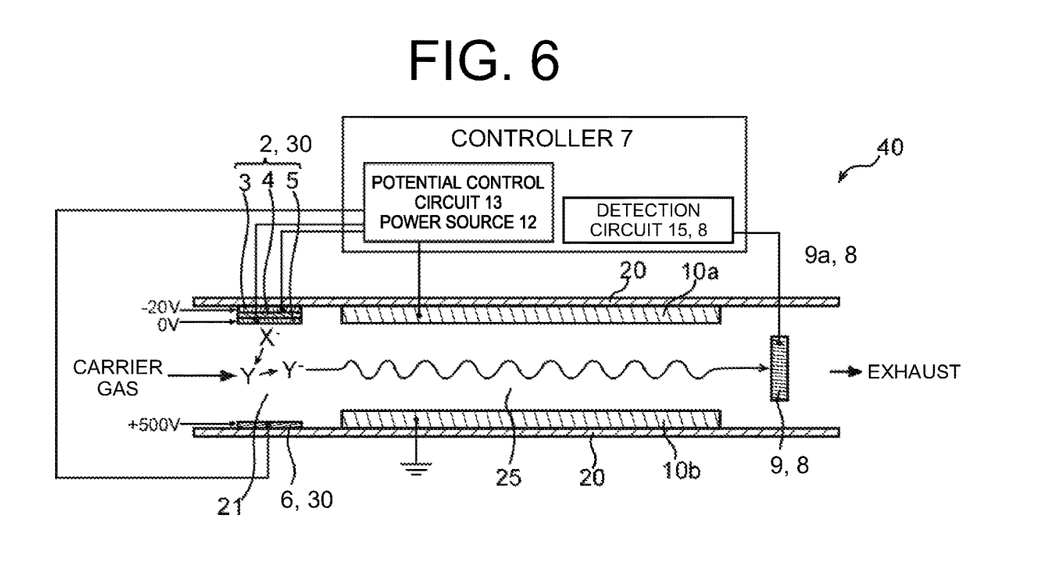
FIG. 6 is a schematic cross-sectional view of the ion mobility analysis apparatus according to an embodiment of the present invention.

FIG. 5 is a schematic cross-sectional view of the ion mobility analysis apparatus in the positive ion mode, and FIG. 6 is a schematic cross-sectional view of the ion mobility analysis apparatus in the negative ion mode. The ion mobility analysis apparatus in the positive ion mode and the negative ion mode may include two ion collector electrodes 9a and 9b as illustrated in FIG. 5 or may include the ion collector electrode 9 as illustrated in FIG. 6.

The ion mobility analysis apparatus 40 according to the present embodiment includes the ion generation apparatus 30, the ion detector 8, and the electric field formation electrodes 10a and 10b, and the ion detector 8 and the controller 7 are provided to measure the current generated when the ion detector 8 receives a charge from an ion and outputs the IMS spectrum.

The ion mobility analysis apparatus 40 according to the present embodiment ionizes the sample gas included in the carrier gas in the reaction chamber 21 by using the ion generation apparatus 30 described in the first embodiment and distributes the ions together with the carrier gas in a field asymmetric ion travel portion 25 between parallel plate electrodes (a region between the electric field formation electrode 10a and the electric field formation electrode 10b). Then, the ion collector electrodes 9a, 9b, and 9 (the ion detector 8), which are arranged downstream of the field asymmetric ion travel portion 25, detect negative ions or positive ions having traveled through the field asymmetric ion travel portion 25.

The carrier gas is preferably clean dry air. The sample gas and the carrier gas enter the reaction chamber 21 after being introduced through the sample inlet. The reaction chamber 21 is a region between the surface electrode 5 of the electron emission device 2 and the opposite electrode 6. The electron emission device 2 may be provided on an inner wall of the chassis 20, and the opposite electrode 6 may be provided on an inner wall opposite to the inner wall on which the electron emission device 2 is provided. The opposite electrode 6 is provided to be opposite to the surface electrode 5 of the electron emission device 2. The configuration of the electron emission device 2 has been described in the first embodiment and is therefore omitted here.

When the ion generation apparatus 30 and the ion mobility analysis apparatus 40 are in the positive ion mode, the controller 7 (the potential control circuit 13 and the power source 12) applies a voltage to the lower electrode 3, the surface electrode 5, or the opposite electrode 6 such that the potential of the surface electrode 5 becomes higher than the potential of the lower electrode 3 and the potential of the opposite electrode 6. With such an application of the voltage, as described in the first embodiment, the positive ion $X^+$ generated near the surface electrode 5 travels through the reaction chamber 21 toward the opposite electrode 6. As the sample gas Y is supplied to the reaction chamber 21 together with the carrier gas, a positive charge is transferred to the sample gas Y from the positive ion $X^+$ generated by the emitted electron, and the sample gas becomes positively ionized, as illustrated in FIG. 5. The positive ion $Y^+$ of the sample gas then flows to the field asymmetric ion travel portion 25 together with the carrier gas. The positive ion $Y^+$ of the sample gas may be traveled to the field asymmetric ion travel portion 25 by use of the potential difference between the reaction chamber 21 and the field asymmetric ion travel portion 25.

When the ion generation apparatus 30 and the ion mobility analysis apparatus 40 are in the negative ion mode, the controller 7 (the potential control circuit 13 and the power source 12) applies a voltage to the lower electrode 3, the surface electrode 5, or the opposite electrode 6 such that the potential of the surface electrode 5 becomes higher than the potential of the lower electrode 3 and the potential of the surface electrode 5 becomes lower than the potential of the opposite electrode 6. With such an application of the voltage, as described in the first embodiment, the negative ion $X^-$ generated near the surface electrode 5 travels through the reaction chamber 21 toward the opposite electrode 6. As the sample gas is supplied to the reaction chamber 21, a negative charge is transferred to the sample gas Y from the negative ion $X^-$ generated by the emitted electron, and the sample gas becomes negatively ionized, as illustrated in FIG. 6. The negative ion $Y^-$ of the sample gas then flows to the field asymmetric ion travel portion 25 together with the carrier gas. The negative ion $Y^-$ of the sample gas may be traveled to the field asymmetric ion travel portion 25 by the use of the potential difference between the reaction chamber 21 and the field asymmetric ion travel portion 25.

The field asymmetric ion travel portion 25 is a region between the electric field formation electrode 10a and the electric field formation electrode 10b. The electric field formation electrode 10a may be provided on an inner wall of the chassis 20, and the electric field formation electrode 10b may be provided on an inner wall opposite to the inner wall where the electric field formation electrode 10a is provided. The electric field formation electrode 10b may be provided to be opposite to the electric field formation electrode 10a.

The ions of the sample gas, which have traveled from the reaction chamber 21 to the field asymmetric ion travel portion 25, change their traveling direction while swaying due to changes in the electric field produced by the application of a dispersive voltage (asymmetric high-frequency voltage) to the electric field formation electrodes 10a and 10b. The value of the ion mobility of the sample gas changes depending on the electric field intensity. The separation of ions in FAIMS is based on changes in the ion mobility at a high electric field intensity.

The time-average dispersive voltage is zero in one cycle of a waveform. The voltage is approximately plus minus several thousand V (±100 to ±2000 V) between the electrodes, the electric field intensity is plus minus several ten thousand V/cm (approximately ±5000 to ±40000 V/cm), and the frequency is from several hundred kHz to several MHz (100 kHz to 3 MHz). The application of a compensation voltage (CV) together with the dispersive voltage between the electric field formation electrodes 10a and 10b changes the ion mobility and changes the traveling direction. Therefore, scanning the compensation voltage (CV) by time changes the ion species that may reach the ion collector electrodes 9, 9a, and 9b (the ions having reached the electric field formation electrodes 10a and 10b are neutralized). Therefore, the IMS spectrum may be obtained by measuring the IMS intensity (collected current) by the ion detector 8. Thus, the ions may be separated and detected.

The compensation voltage (DC voltage) is in a range of approximately ±100 V, and the electric field intensity is in a range of ±2000 V/cm. The interval between the electric field formation electrode 10a and the electric field formation electrode 10b is from several tens of μm to several mm (0.01 to 2 mm), and the length of the electric field formation electrodes 10a and 10b (the length of the field asymmetric ion travel portion 25) is from several hundreds of μm to several tens of mm (0.1 to 30 mm). The ions having reached the electric field formation electrodes 10a and 10b are neutralized. The neutralized substance is either exhausted together with the carrier gas or accumulated in the electric field formation electrodes 10a, 10b or the ion collector electrode 9. The accumulated substance may be removed by flowing a gas (e.g., clean dry air) including no sample gas through the sample inlet or a carrier gas inlet. The flowing gas preferably has a high temperature.

The ions having passed through the field asymmetric ion travel portion 25 are detected by the ion detector 8, and the neutral substance and the carrier gas are exhausted through the exhaust port.

In the negative ion mode, the voltage applied between the lower electrode 3 and the surface electrode 5 of the electron emission device 2 may be set to 10 V to 18 V, the polarities of the opposite electrode 6 and the ion detector 8 are set to be positive, and the substances that are easy to be negatively ionized may be measured.

In the positive ion mode, the voltage applied between the lower electrode 3 and the surface electrode 5 of the electron emission device 2 may be set to 18 V to 50 V, the polarities of the opposite electrode 6 and the ion detector 8 are set to be negative, and the substances that are easy to be positively ionized may be measured.

The ion mobility analysis apparatus 40 may switch between the negative ion mode and the positive ion mode to analyze the identical sample gas in both modes. Thus, both the IMS spectrum in the negative ion mode and the IMS spectrum in the positive ion mode may be obtained for one sample gas, and the analysis accuracy may be improved.

In a case where the ion detector 8 includes the ion collector electrode 9a to detect negative ions and the ion collector electrode 9b to detect positive ions, as in the ion mobility analysis apparatus 40 illustrated in FIG. 5, there is no need to reverse the polarity of the ion detector 8 even when the negative ion mode and the positive ion mode are switched.

In a case where the ion detector 8 includes only the single ion collector electrode 9, as in the ion mobility analysis apparatus 40 illustrated in FIG. 6, the polarity of the ion detector 8 is reversed when the negative ion mode and the positive ion mode are switched. Accordingly, the controller 7 may output the IMS spectrum in the negative ion mode and the IMS spectrum in the positive ion mode. Thus, the use of only the single ion collector electrode 9 may reduce the size of the ion mobility analysis apparatus.

The description of the ion generation apparatus according to the first embodiment also applies to the ion generation apparatus included in the ion mobility analysis apparatus according to the third embodiment as long as there is no contradiction. The description of the second embodiment also applies to the third embodiment as long as there is no contradiction.

Positive Ion Detection Experiment 3 g of silicone resin and 0.039 g (1.3%) of Ag nanoparticles were agitated by using an ultrasonic vibrator to prepare an application liquid. The application liquid was applied by a spin coating method on an MAM (molybdenum, aluminum, molybdenum) electrode (lower electrode) on a glass substrate to form an intermediate layer having a thickness of 1.0 μm. A gold electrode (surface electrode) having a thickness of 20 nm was formed on the intermediate layer by a sputtering method. The thus fabricated electron emission device was mounted in a drift-tube ion mobility analysis apparatus as illustrated in FIGS. 3 and 4, and analysis using ion mobility spectrometry (IMS) was executed in the positive ion mode.

In the analysis, the carrier gas was humidified air (humidity: 44%) and the drift gas was dry air. No sample gas was supplied into the analysis apparatus, that is, only the carrier gas was supplied into the analysis apparatus. The potential of the ion collector electrode was set to 0 V, the potential of the surface electrode was set to +3000 V, and the potential of the lower electrode was set to +2981 V (device drive voltage: 19 V), +2980 V (device drive voltage: 20 V), or +2972 V (device drive voltage: 28 V). The potential of an aperture grid was +163 V.

Figure 7:
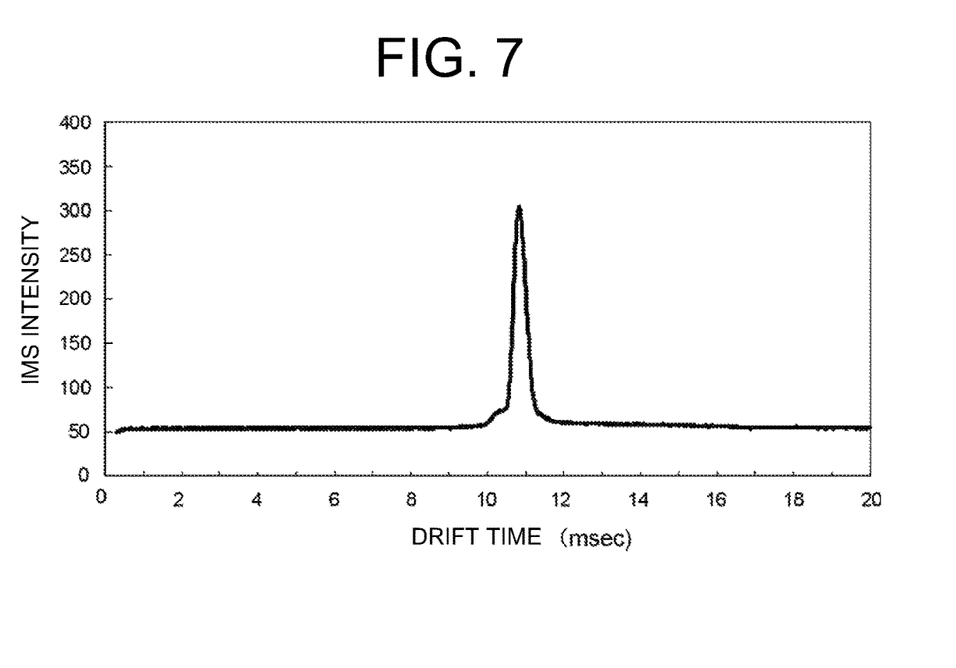
FIG. 7 illustrates an IMS spectrum measured in a positive ion detection experiment.
Figure 8:
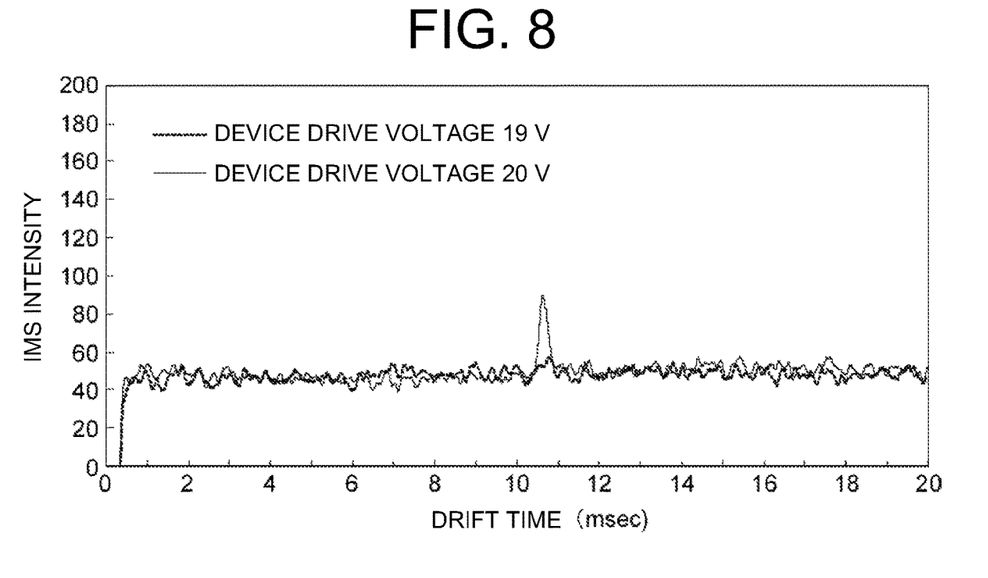
FIG. 8 illustrates IMS spectra measured in a positive ion detection experiment.

FIG. 7 illustrates an IMS spectrum obtained by analysis with a device drive voltage of 28 V, and FIG. 8 illustrates IMS spectra obtained by analysis with device drive voltages of 19 V and 20 V. As illustrated in the IMS spectrum in FIG. 7, it is confirmed that the peak of positive ions generated from the humidified air appeared in the IMS spectrum in the positive ion mode. As illustrated in FIG. 8, no peak appeared in the IMS spectrum with a device drive voltage of 19 V, but a peak appeared in the IMS spectrum with a device drive voltage of 20 V. Therefore, it is confirmed that, when the carrier gas is humidified air in the positive ion mode, positive ions may be generated and analyzed by the application of a voltage of 20 V or more between the lower electrode and the surface electrode. It is considered that this voltage varies depending on the configuration (e.g., the thickness of the intermediate layer), or the like, of the electron emission device.

When the carrier gas was dry air in the positive ion mode, the peak appeared in the IMS spectrum at a device drive voltage of 28 V.

Next, analysis was executed by ion mobility spectrometry (IMS) using, in the positive ion mode, dry air as the carrier gas and a device drive voltage of 55 V (the potential of the lower electrode: +2945 V) or 60 V (the potential of the lower electrode: +2940 V). The other analytical conditions are the same as those in the analysis described above.

Figure 9:
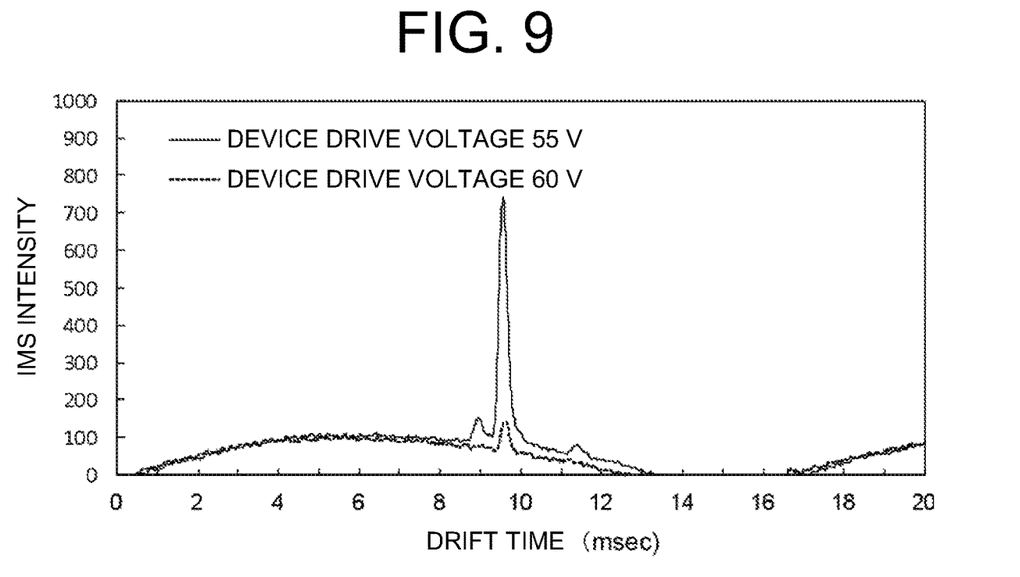
FIG. 9 illustrates IMS spectra measured in a positive ion detection experiment.

FIG. 9 illustrates the IMS spectra obtained from the analysis. Although the large peak of positive ions generated from the dry air appeared in the IMS spectrum with a device drive voltage of 55 V, the peak with the IMS intensity significantly reduced appeared in the IMS spectrum with a device drive voltage of 60 V. It is considered that this reduction in the peak intensity was caused by a damage to the electron emission device. Therefore, the upper limit of the device drive voltage was approximately 60 V for the electron emission device fabricated in this experiment. However, this voltage is considered to vary depending on the configuration, or the like, of the electron emission device.

Negative Ion Detection Experiment

The analysis apparatus used in the positive ion detection experiment was set to the negative ion mode, and the analysis by ion mobility spectrometry (IMS) was executed.

In the analysis, the carrier gas was humidified air (humidity: 44%) and the drift gas was dry air. No sample gas was supplied into the analysis apparatus, that is, only the carrier gas was supplied into the analysis apparatus. The potential of the ion collector electrode was set to 0 V, the potential of the surface electrode was set to −3000 V, and the potential of the lower electrode was set to −3009 V (device drive voltage: 9 V), −3010 V (device drive voltage: 10 V), −3010.5 V (device drive voltage: 10.5 V), −3011 V (device drive voltage: 11 V), −3011.2 V (device drive voltage: 11.2 V) or −3011.5 V (device drive voltage: 11.5 V), −3013 V (device drive voltage: 13 V), −3014.5 V (device drive voltage: 14.5 V), −3015 V (device drive voltage: 15 V), 3015.5 V (device drive voltage: 15.5 V), −3016 V (device drive voltage: 16 V), 3016.5 V (device drive voltage: 16.5 V), −3017 V (device drive voltage: 17 V), −3017.5 V (device drive voltage: 17.5 V), or −3018 V (device drive voltage: 18 V). The potential of the aperture grid was −163 V.

Figure 10:
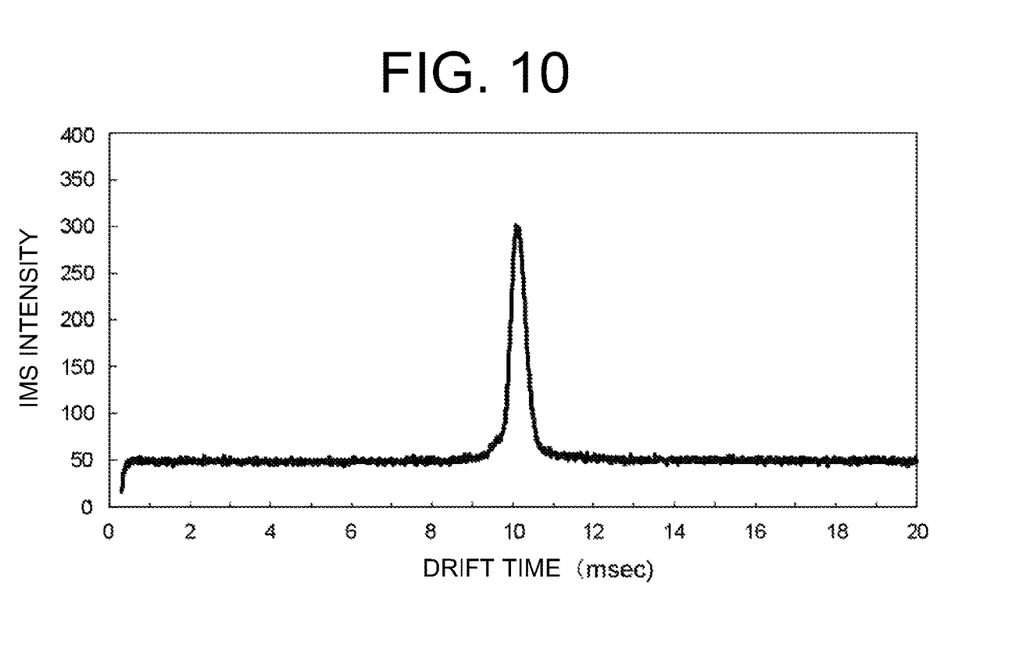
FIG. 10 illustrates an IMS spectrum measured in a negative ion detection experiment.
Figure 11:
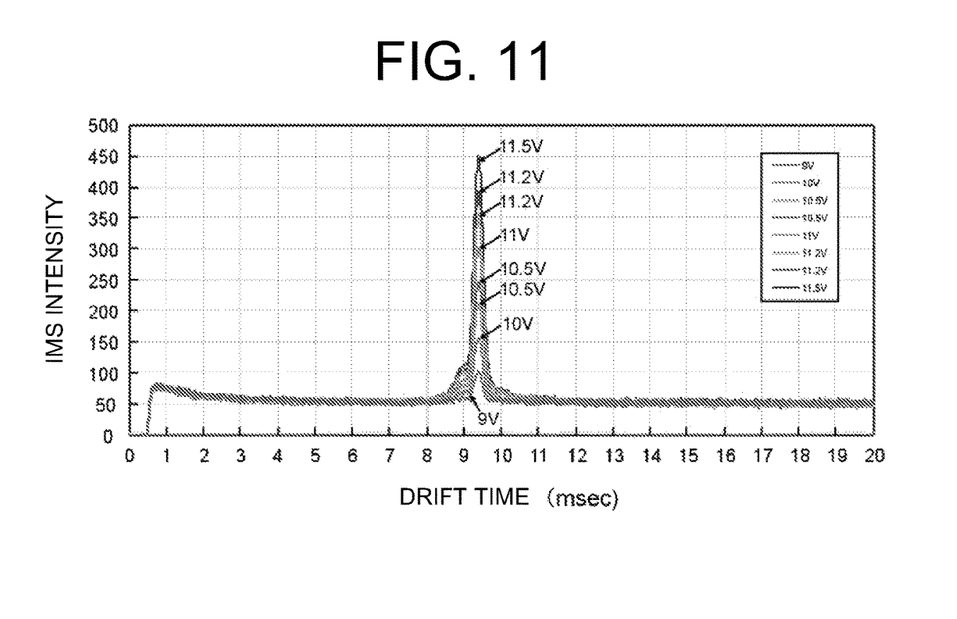
FIG. 11 illustrates IMS spectra measured in a negative ion detection experiment.
Figure 12:
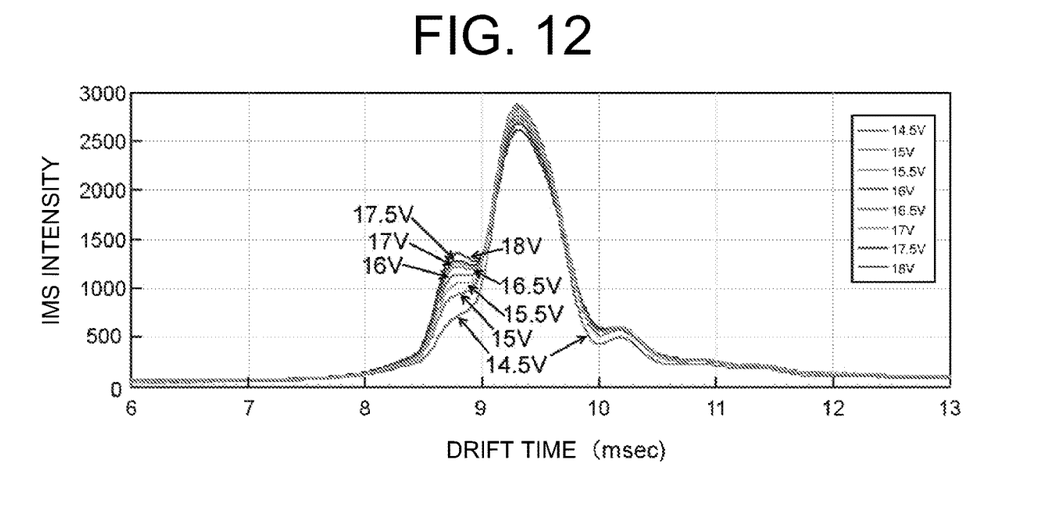
FIG. 12 illustrates IMS spectra measured in a negative ion detection experiment.

FIG. 10 illustrates the IMS spectrum obtained by the analysis with a device drive voltage of 13 V, and FIG. 11 illustrates the IMS spectra obtained by analysis with device drive voltages of from 9 V to 11.5 V. FIG. 12 illustrates the IMS spectra obtained by analysis with device drive voltages of from 14.5 V to 18 V.

As illustrated in the IMS spectrum of FIG. 10, it is confirmed that the peak of negative ions generated from the humidified air appeared in the IMS spectrum in the negative ion mode. As illustrated in FIG. 11, the peak appeared in the IMS spectrum with a device drive voltage of 9 V, and the IMS intensity of the peak gradually increased as the device drive voltage increased. Therefore, it is confirmed that, when the carrier gas is humidified air in the negative ion mode, negative ions may be generated and analyzed by the application of a voltage of 9 V or more between the lower electrode and the surface electrode. It is considered that this voltage varies depending on the configuration (e.g., the thickness of the intermediate layer), or the like, of the electron emission device.

As illustrated in the IMS spectra of FIG. 12, in addition to the primary peak at approximately 9.3 milliseconds, the peak appeared at approximately 8.8 milliseconds, and this peak gradually increased with a device drive voltage of 15 V or more.

Ethanol Analysis Experiment

The analysis apparatus used in the positive ion detection experiment was set to the positive ion mode, and ethanol (sample gas) was analyzed.

Figure 13:
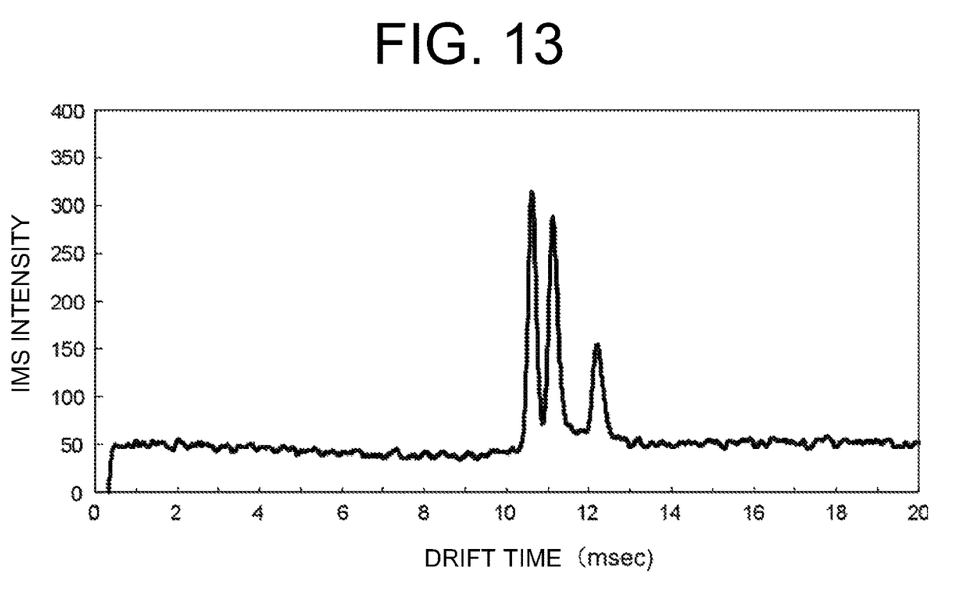
FIG. 13 illustrates an IMS spectrum measured in an ethanol analysis experiment.

In the analysis, the sample gas was 0.3 ppm ethanol, the carrier gas was humidified air (humidity: 44%), and the drift gas was dry air. The potential of the ion collector electrode was set to 0 V, the potential of the surface electrode was set to +3000 V, and the potential of the lower electrode was set to +2962 V (device drive voltage: 38 V). FIG. 13 illustrates the obtained IMS spectrum.

In this IMS spectrum, it is considered that the peak at 11.1 milliseconds is the peak of ethanol and the peak at 12.2 milliseconds is the peak of ethanol dimer. The peak at 10.6 milliseconds is the peak of the humidified air.

Thus, it is confirmed that the sample gas may be analyzed in the positive ion mode.

What is claimed is:

1. An ion generation apparatus comprising:
an electron emission device;
an opposite electrode; and
a controller, wherein
the electron emission device includes a lower electrode, a surface electrode, and an intermediate layer provided between the lower electrode and the surface electrode,
the opposite electrode is provided to be opposite the surface electrode, and
the controller is provided to apply a voltage to the surface electrode, the lower electrode, or the opposite electrode such that a potential of the surface electrode becomes higher than both a potential of the lower electrode and a potential of the opposite electrode in a positive ion mode for generating positive ions from a gas component near the surface electrode by electrons emitted from the surface electrode, the positive ions travel toward the opposite electrode, and the positive ions are generated from the gas component between the surface electrode and the opposite electrode.

2. The ion generation apparatus according to claim 1, wherein the controller is further provided to apply a voltage between the lower electrode and the surface electrode such that the electron emission device emits electrons having an energy higher than an ionization energy of the gas component near the surface electrode in the positive ion mode, and the gas component is between the surface electrode and the opposite electrode.

3. The ion generation apparatus according to claim 1, wherein the controller is further provided to apply a voltage of 16 V or more and 60 V or less between the lower electrode and the surface electrode in the positive ion mode.

4. The ion generation apparatus according to claim 1, wherein the controller is further provided to:
apply a voltage to the surface electrode, the lower electrode, or the opposite electrode such that the potential of the surface electrode becomes higher than the potential of the lower electrode and lower than the potential of the opposite electrode in a negative ion mode for generating negative ions; and
switch between the negative ion mode and the positive ion mode.

5. The ion generation apparatus according to claim 4, wherein the controller is further provided to apply a voltage of 6 V or more and 60 V or less between the lower electrode and the surface electrode in the negative ion mode.

6. The ion generation apparatus according to claim 4, wherein the controller is further provided to switch between the negative ion mode and the positive ion mode such that a potential difference between the surface electrode and the lower electrode in the positive ion mode becomes larger than a potential difference between the surface electrode and the lower electrode in the negative ion mode.

7. An ion mobility analysis apparatus comprising:
an ion generation apparatus;
an ion detector; and
an electric field formation electrode, wherein:
the ion generation apparatus comprises an electron emission device, an opposite electrode, and a controller,
the electron emission device includes a lower electrode, a surface electrode, and an intermediate layer provided between the lower electrode and the surface electrode,
the opposite electrode is provided to be opposite to the surface electrode,
the controller is provided to apply a voltage to the surface electrode, the lower electrode, or the opposite electrode such that a potential of the surface electrode becomes higher than a potential of the lower electrode and a potential of the opposite electrode in a positive ion mode for generating positive ions,
the ion detector and the controller are provided to measure a current generated when the ion detector receives a charge from an ion and to output an ion mobility spectrometry spectrum, and
the controller is further provided to adjust a voltage applied between the lower electrode and the surface electrode such that a reference peak appearing in the ion mobility spectrometry spectrum has a predetermined height or a predetermined area.

8. The ion mobility analysis apparatus according to claim 7, wherein the controller is further provided to fix the potential of the surface electrode and change the potential of the lower electrode to adjust the voltage applied between the lower electrode and the surface electrode.

9. The ion mobility analysis apparatus according to claim 7, wherein the controller is further provided to:
apply a voltage to the surface electrode, the lower electrode, or the opposite electrode such that the potential of the surface electrode becomes higher than the potential of the lower electrode and lower than the potential of the opposite electrode in the negative ion mode for generating negative ions;
switch between the negative ion mode and the positive ion mode; and
adjust a voltage applied between the lower electrode and the surface electrode such that a height or area of a first reference peak appearing in the ion mobility spectrometry spectrum in the positive ion mode is substantially identical to a height or area of a second reference peak appearing in the ion mobility spectrometry spectrum in the negative ion mode.

10. The ion mobility analysis apparatus according to claim 7, wherein the controller is further provided to:

apply a voltage to the surface electrode, the lower electrode, or the opposite electrode such that the potential of the surface electrode becomes higher than the potential of the lower electrode and lower than the potential of the opposite electrode in the negative ion mode for generating negative ions;

switch between the negative ion mode and the positive ion mode; and when switching between the negative ion mode and the positive ion mode, change the potential of the surface electrode to a potential having an opposite polarity and substantially an equal absolute value and change the potential of the lower electrode to a potential having an opposite polarity and a different absolute value.

11. The ion mobility analysis apparatus according to claim 7, wherein the controller is further provided to:

apply a voltage to the surface electrode, the lower electrode, or the opposite electrode such that the potential of the surface electrode becomes higher than the potential of the lower electrode and lower than the potential of the opposite electrode in the negative ion mode for generating negative ions;

switch between the negative ion mode and the positive ion mode;

integrate and average a plurality of ion mobility spectrometry spectra obtained by repeating a measurement to calculate an average ion mobility spectrometry spectrum; and switch between the negative ion mode and the positive ion mode each time calculation of the average ion mobility spectrometry spectrum ends.

12. An ion mobility analysis apparatus comprising:
an ion generation apparatus;
an ion detector; and
an electric field formation electrode, wherein
the ion generation apparatus comprises an electron emission device, an opposite electrode, and a controller,
the electron emission device comprises a lower electrode, a surface electrode, and an intermediate layer provided between the lower electrode and the surface electrode,
the opposite electrode is provided to be opposite to the surface electrode,
the controller is provided to apply a voltage to the surface electrode, the lower electrode, or the opposite electrode such that a potential of the surface electrode becomes higher than a potential of the lower electrode and a potential of the opposite electrode in a positive ion mode for generating positive ions,
the ion detector and the controller are provided to measure a current generated when the ion detector receives a charge from an ion and to output an ion mobility spectrometry spectrum, and
the controller is further provided to:
apply a voltage to the surface electrode, the lower electrode, or the opposite electrode such that the potential of the surface electrode becomes higher than the potential of the lower electrode and lower than the potential of the opposite electrode in the negative ion mode for generating negative ions;
switch between the negative ion mode and the positive ion mode; and
when switching between the negative ion mode and the positive ion mode, change the potential of the surface electrode to a potential having an opposite polarity and substantially an equal absolute value and change the potential of the lower electrode to a potential having an opposite polarity and a different absolute value.

13. The ion mobility analysis apparatus according to claim 7, wherein the controller is provided to apply a voltage between the lower electrode and the surface electrode such that the electron emission device emits electrons having an energy higher than an ionization energy of a gas component between the surface electrode and the opposite electrode in the positive ion mode.

14. The ion mobility analysis apparatus ion according to claim 7, wherein the controller is provided to apply a voltage of 16 V or more and 60 V or less between the lower electrode and the surface electrode in the positive ion mode.

15. The ion mobility analysis apparatus according to claim 7, wherein the controller is provided to apply a voltage to the surface electrode, the lower electrode, or the opposite electrode such that the potential of the surface electrode becomes higher than the potential of the lower electrode and lower than the potential of the opposite electrode in a negative ion mode for generating negative ions and is provided to switch between the negative ion mode and the positive ion mode.

16. The ion mobility analysis apparatus according to claim 15, wherein the controller is provided to apply a voltage of 6 V or more and 60 V or less between the lower electrode and the surface electrode in the negative ion mode.

17. The ion mobility analysis apparatus according to claim 15, wherein the controller is provided to switch between the negative ion mode and the positive ion mode such that a potential difference between the surface electrode and the lower electrode in the positive ion mode becomes larger than a potential difference between the surface electrode and the lower electrode in the negative ion mode.

* * * * *